April 14, 1925.
C. G. ROSS
1,533,612
BUMPER FOR MOTOR VEHICLES
Filed May 29, 1924
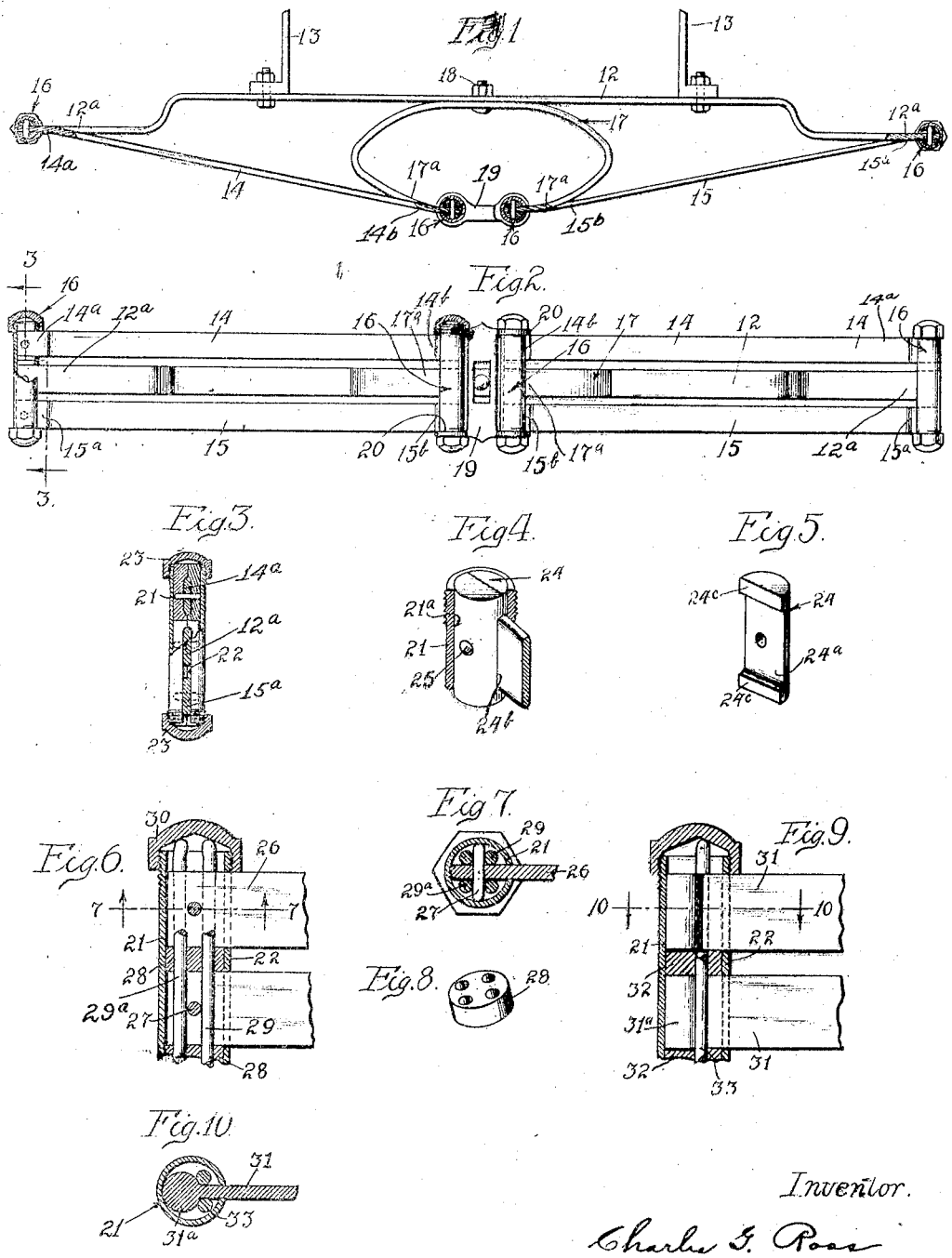
Inventor.
Charles G. Ross
By Leslie W. Fricke
Attorney Patented Apr. 14, 1925.

1,533,612

UNITED STATES PATENT OFFICE.

CHARLES G. ROSS, OF CHICAGO, ILLINOIS, ASSIGNOR OF ONE-HALF TO WILLIAM L. ROSS, OF CHICAGO, ILLINOIS.

BUMPER FOR MOTOR VEHICLES.

Application filed May 29, 1924. Serial No. 716,578.

*To all whom it may concern:*

Be it known that I, CHARLES G. ROSS, a citizen of the United States, residing at Chicago, in the county of Cook and State of Illinois, have invented certain new and useful Improvements in Bumpers for Motor Vehicles, of which the following is a specification.

My invention relates to bumpers for motor vehicles.

Bumpers of this type comprise an impact section and a supporting section therefor, the latter being secured to the frame members of the motor vehicle. It is difficult to manufacture the impact and supporting sections of the bumper from one continuous piece of metal. Furthermore, it is desirable to make the impact section of the bumper of considerable width so that the likelihood of bumpers on other vehicles, in case of collision, slipping over or under the impact section will be minimized, consequently the impact section frequently, comprises a plurality of parallelly extending bars. The several parts of the bumper are ordinarily made of standard resilient steel bar stock. It has become common practice, therefore, to make the impact section of the bumper separate from the supporting means therefor which, obviously necessitates some form of connection between the ends of the impact section and the adjacent ends of the supporting means. One of the objects of my invention is to provide a form of connection between the parts aforesaid which will be of very simple construction, inexpensive to manufacture, easy to assemble or repair, pleasing in appearance and which will be strong, durable and reliable in operation.

My invention contemplates the provision of a slotted tubular member into which the ends of the bars to be connected may be inserted; and, a further object of my invention is to provide means preferably within the tubular member for securely holding the bars against movement in the direction of their length relative to the tubular member.

Another object of my invention is the provision of means whereby the ends of the bars disposed within the tubular member may be securely clamped together and to said member thereby securely holding them against movement in a vertical direction relative to each other and to said member.

The invention consists in the novel constructions, arrangements and devices to be hereinafter described and claimed for carrying out the above stated objects and such other objects as will appear from the following description of certain preferred embodiments illustrated in the accompanying drawings, wherein—

Fig. 1 is a plan view and Fig. 2 is a front elevational view of a bumper embodying the principles of my invention;

Fig. 3 is a sectional view, on an enlarged scale, taken on the line 3—3 of Fig. 2;

Fig. 4 is a perspective view, on a further enlarged scale, of one form of means employed for securing the bumper bars within the tubular connecting members;

Fig. 5 is a perspective view of one of the parts shown in Fig. 4;

Fig. 6 is a vertical sectional view of a modified construction embodying the principles of my invention.

Fig. 7 is a sectional view taken on the line 7—7 of Fig. 6;

Fig. 8 is a perspective view of one of the spacing members employed in the construction shown is Figs. 6 and 7;

Fig. 9 is a vertical sectional view of another modified construction, also embodying the principles of my invention; and Fig. 10 is a sectional view taken on the line 10—10 of Fig. 9.

Like characters of reference designate like parts in the several views.

Referring first to Figs. 1 and 2, the bumper therein shown includes a transversely extending resilient supporting bar 12 which may be mounted on the ends of the respective longitudinally extending channel members of the chassis frame (not shown) by any suitable means, for example, L-shaped bracket members 13. Two resilient impact members 14 placed end to end are disposed in a plane above that of the supporting member 12. Two resilient impact members 15 also placed end to end are disposed in a plane below that of the supporting member 12. The outer ends 14ª and 15ª of the two sets of impact members and the respective outer ends 12ª of the supporting member 12 are preferably formed so that they are in substantial alignment, said adjacent ends being connected by a device designated generally by the reference numeral 16. A resilient bar 17 of elliptical formation has its medial portion bearing against and fastened to the medial portion of the supporting member 12 by a bolt 18. The ends 17ª of the bar 17 and the respective inner ends 14ᵇ and 15ᵇ of the impact bars 14 and 15 are preferably formed so that they are in substantial alignment. A member 19 is provided on its upper and lower ends with laterally extending perforated ears 20. Devices 16 extend, respectively, through the sets of ears 20 of the connecting member 19 and in conjunction with the member 19 complete the connection between the respective inner ends of the impact bars 14 and 15 and the adjacent ends of the bar 17.

Each of the aforesaid members 16 includes a vertically disposed tubular member 21 which is provided with a vertically extending slot 22 and is externally treaded on its upper and lower ends for cap nuts 23. In that form of my invention shown in Figs. 1 to 5, inclusive, pairs of complementary members 24, respectively, are mounted on the inner and outer ends of the impact bars 14 and 15, the outer ends of the supporting bar 12 and the ends of the bar 17. The members 24 are recessed at 24ª, Fig. 5, on their adjacent faces, thus providing a slot 24ᵇ, Fig. 4, to receive the end of the bar, the two members being secured together and on the bar by any suitable means, for example, by a rivet 25. The members 24 are shaped externally to fit snugly within the respective bores 21ª of the tubular members. The members 24 are of a length sufficient to provide head and foot portions 24ᶜ.

The assembly of the various parts of the bumper will be clearly understood from the foregoing description and the following specific description of the manner in which the outer ends of the impact bars 14 and 15 and the supporting bar 12 are connected. One of the nuts 23 is threaded onto one end, for example, the lower end, of the tubular member 21. The outer end of the bar 15, with its members 24 secured thereto, is passed down through the slot 22, the lower ends of the members resting on the nut 23. The outer end of the bar 12, with its members 24 secured thereto, is then slipped through the slot 22, the lower ends of its members resting on the top end of the members carried by the bar 15. The outer end of the bar 14, with its members 24 secured thereto, is then passed through the slot 22, the lower end of its members resting on the top end of the members carried by the bar 12. The other nut 23 is then threaded onto the upper end of the tubular member. It will be noted that the portions 24ᶜ of the members 24 provide spacing means between the bars 14 and 12 and the bars 12 and 15. It will also be noted that the three members 24 completely fill the bore of the tubular member and are effectively clamped together between the nuts 23 which, obviously, securely holds the bars 12, 14 and 15 against vertical movement and against movement in the direction of their length relative to the tubular member.

A modified form of connection is shown in Figs. 6 and 7. In this construction the ends of the bars 26 carry laterally projecting pins 27. The ends of said bars are adapted to be slipped down through the slot 22 with the pins 27 lying within the tubular member. An apertured spacing member 28, Fig. 8, is preferably disposed within the tubular member and between the bars. Retaining rods 29 extend through the spacing member or members 28, being disposed between the extremities of the respective pins 27 and the slot 22. The inner sides of the respective nuts 30, (only one being shown) are concavely recessed and the retaining rods 29 are of such length that when the nuts 30 are turned home they will tend to force the ends of the rods 29 tightly against the sides of the pin 27 thereby preventing outward movement of the bars 26 in the direction of their length relative to the tubular member 21. Rods 29 may be employed in conjunction with the rods 29 so as to hold more securely the bars against movement relative to the tubular member. The parts are so arranged that the bars 26 are securely clamped between the nuts 30 thereby preventing any relative movement of the bars in a vertical direction.

In that form of my invention shown in Figs. 9 and 10 the bars 31 are formed on their ends with enlarged portions 31ª. Apertured spacing members 32 are disposed within the tubular member between the bars. Retaining rods 33, similar to the rods 29, extend through the spacing member or members 32, being disposed in front of the projecting portions 31ª of the bars.

In all forms of my invention, the impact bars and the supporting bar are securely held against movement in the direction of their length relative to the connecting devices 16. The ends of the bars are also securely clamped against vertical movement relative to each other and to the tubular connecting members by the clamping nuts. The construction is very simple and inexpensive to manufacture. The several parts of the bumper may be readily and conveniently assembled. Should one of the impact bars, for example, or the supporting bar 12 receive such a severe blow that it will not return to its original shape, the particular part may be readily replaced by a good part, the only tool needed being a common wrench. Since the means for securing the adjacent ends of the bars together are all disposed within the tubular members, a slightly and very pleasing form of connection is obtained. The connecting devices are strong, durable and reliable in operation.

I do not intend to limit my invention to the details of construction shown and described, except only in so far as certain of the appended claims are specifically so limited, as it will be obvious that modifications may be made without departing from the principles of my invention.

I claim:

1. In a bumper construction, the combination of two bars disposed so that one end of one bar is adjacent one end of the other bar, a tubular member having slot means adapted to receive the aforesaid ends of said bars, and means for holding the aforesaid ends of said bars within said member.

2. In a bumper construction, the combination of two bars disposed so that one end of one bar is adjacent one end of the other bar, a tubular member having slot means adapted to receive the aforesaid ends of said bars, means to prevent movement of said bars in the direction of their length relative to said member, and means for clamping the aforesaid ends of said bars together within said member.

3. In a bumper construction, the combination of two bars disposed so that one end of one bar is adjacent one end of the other bar, a tubular member having slot means adapted to receive the aforesaid ends of said bars, means to prevent movement of said bars in the direction of their length relative to said member, abutment means on one end of said member, and a nut on the other end of said member whereby the aforesaid ends of said bars may be clamped together within said member.

4. In a bumper construction, the combination of two bars disposed so that one end of one bar is adjacent one end of the other bar, a tubular member having slot means adapted to receive the aforesaid ends of said bars, and means within said member for holding said bars against movement in the direction of their length relative to said member.

5. In a bumper construction, the combination of two bars disposed so that one end of one bar is adjacent one end of the other bar, a tubular member having slot means adapted to receive the aforesaid ends of said bars, means within said member to prevent movement of said bars in the direction of their length relative to said member, and means for clamping the aforesaid ends of said bars together within said member.

6. In a bumper construction, the combination of two bars disposed so that one end of one bar is adjacent one end of the other bar, a tubular member having slot means adapted to receive the aforesaid ends of said bars, means within said member to prevent movement of said bars in the direction of their length relative to said member, abutment means on one end of said member, and a nut on the other end of said member whereby the aforesaid ends of said bars may be clamped together within said member.

7. In a bumper construction, the combination of two bars disposed so that one end of one bar is adjacent one end of the other bar, a tubular member having slot means adapted to receive the aforesaid ends of said bars, projections provided on the aforesaid ends of said bars, and means within said member for engaging said projections thereby holding said bars against movement in the direction of their length relative to said member.

8. In a bumper construction, the combination of two bars disposed so that one end of one bar is adjacent one end of the other bar, a tubular member having slot means adapted to receive the aforesaid ends of said bars, projections provided on the aforesaid ends of said bars, means within said member for engaging said projections thereby holding said bars against movement in the direction of their length relative to said member, and means for clamping the aforesaid ends of said bars together within said member.

9. In a bumper construction, the combination of two bars disposed so that one end of one bar is adjacent one end of the other bar, a tubular member having slot means adapted to receive the aforesaid ends of said bars, projections provided on the aforesaid ends of said bars, means within said member for engaging said projections thereby holding said bars against movement in the direction of their length relative to said member, abutment means on one end of said member, and a nut on the other end of said member whereby the aforesaid ends of said bars may be clamped together within said member.

10. In a bumper construction, the combination of two bars disposed so that one end of one bar is adjacent one end of the other bar, a tubular member having slot means adapted to receive the aforesaid ends of said bars, devices adapted to be slipped over the respective aforesaid ends of said bars and then to be inserted into said member, and means for fastening said devices on the respective aforesaid ends of said bars.

11. In a bumper construction, the combination of two bars disposed so that one end of one bar is adjacent one end of the other bar, a tubular member having slot means adapted to receive the aforesaid ends of said bars, devices adapted to be slipped over the respective aforesaid ends of said bars and then to be inserted into said member, means for fastening said devices on the respective aforesaid ends of said bars, and means for clamping said devices together within said member.

12. In a bumper construction, the combination of two bars disposed so that one end of one bar is adjacent one end of the other bar, a tubular member having slot means adapted to receive the aforesaid ends of said bars, devices adapted to be slipped over the respective aforesaid ends of said bars and then to be inserted into said member, means for fastening said devices on the respective aforesaid ends of said bars, abutment means on one end of said member, and a nut on the other end of said member whereby said devices may be clamped together within said member.

13. In a bumper construction, the combination of two bars disposed so that one end of one bar is adjacent one end of the other bar, a tubular member having slot means adapted to receive the aforesaid ends of said bars, pairs of complementary devices adapted to fit onto the respective ends of said bars and then to be inserted into said member, and means to fasten the devices of each pair together and on their bar.

14. In a bumper construction, the combination of two bars disposed so that one end of one bar is adjacent one end of the other bar, a tubular member having slot means adapted to receive the aforesaid ends of said bars, pairs of complementary devices adapted to fit onto the respective ends of said bars and then to be inserted into said member, means to fasten the devices of each pair together and on their bar, and means for clamping said pairs of devices together within said member.

15. In a bumper construction, the combination of two bars disposed so that one end of one bar is adjacent one end of the other bar, a tubular member having slot means adapted to receive the aforesaid ends of said bars, pairs of complementary devices adapted to fit onto the respective ends of said bars and then to be inserted into said member, means to fasten the devices of each pair together and on their bar, abutment means on one end of said member, and a nut on the other end of said member whereby said pairs of devices may be clamped together within said member.

16. In a bumper construction, the combination of two bars disposed so that one end of one bar is adjacent one end of the other bar, a tubular member having slot means adapted to receive the aforesaid ends of said bars, projections provided on the aforesaid ends of said bars, retaining means disposed within said tubular member and between said projections and said slot means, and means for securing said retaining means in the position aforesaid.

17. In a bumper construction, the combination of two bars disposed so that one end of one bar is adjacent one end of the other bar, a tubular member having slot means adapted to receive the aforesaid ends of said bars, projections provided on the aforesaid ends of said bars, retaining means disposed within said tubular member and between said projections and said slot means, abutment means on one end of said tubular member and on which one end of said retaining means may rest, and a nut on the other end of said tubular member and adapted to engage the other end of said retaining means.

18. In a bumper construction, the combination of two bars disposed so that one end of one bar is adjacent one end of the other bar, a tubular member having slot means adapted to receive the aforesaid ends of said bars, projections extending from each side of the aforesaid ends of said bars, retaining means disposed within said tubular member on the respective sides of said bars and between said projections and said slot means, and means for securing said retaining means in the respective positions aforesaid.

19. In a bumper construction, the combination of two bars disposed so that one end of one bar is adjacent one end of the other bar, a tubular member having slot means adapted to receive the aforesaid ends of said bars, projections extending from each side of the aforesaid ends of said bars, retaining means disposed within said tubular member on the respective sides of said bars and between said projections and said slot means, abutment means on one end of said tubular member and on which said retaining means at one end may rest, and a nut on the other end of said tubular member and adapted to engage said retaining means at the other end.

CHARLES G. ROSS.